United States Patent [19]

Carter

[11] Patent Number: 5,165,003
[45] Date of Patent: Nov. 17, 1992

[54] OPTICAL FIBER CABLE INCLUDING INTERLOCKING STITCH BINDER

[75] Inventor: Thomas L. Carter, Durham, N.C.

[73] Assignee: Sumitomo Electric Fiber Optics Corp., Research Triangle Park, N.C.

[21] Appl. No.: 722,654

[22] Filed: Jun. 28, 1991

[51] Int. Cl.⁵ .............................................. G02B 6/44
[52] U.S. Cl. .................................... 385/112; 385/113
[58] Field of Search ....................... 350/96.23, 96.24; 174/112, 116, 117 F, 117 M, 121 R, 122 R, 124 R; 385/109-115

[56] References Cited

U.S. PATENT DOCUMENTS

| | | | |
|---|---|---|---|
| 304,759 | 9/1884 | Shaffer | 174/34 |
| 803,882 | 11/1905 | Coon | 112/441 |
| 1,480,538 | 1/1924 | Parkes | 112/409 |
| 1,619,437 | 3/1927 | Rubel et al. | 112/422 |
| 2,512,489 | 6/1950 | Dills | 2/239 |
| 2,649,062 | 8/1953 | Nogler et al. | 112/1 |
| 3,644,866 | 2/1972 | Deardurff | 338/214 |
| 3,984,622 | 10/1976 | Ross | 174/72 A |
| 4,159,394 | 6/1979 | Ross | 174/72 TR |
| 4,229,615 | 10/1980 | Orr, Jr. et al. | 174/117 M |
| 4,374,608 | 2/1983 | Anderson | 350/96.23 |
| 4,456,331 | 6/1984 | Whitehead et al. | 350/96.23 |
| 4,605,818 | 8/1986 | Arroyo et al. | 350/96.23 X |
| 4,795,232 | 1/1989 | Persson | 350/96.23 |
| 4,826,278 | 5/1989 | Gartside, III et al. | 350/96.23 |
| 4,828,352 | 5/1989 | Kraft | 350/96.23 |
| 4,836,640 | 6/1989 | Gartside, III et al. | 350/96.23 |
| 4,844,575 | 7/1989 | Kinard et al. | 350/96.23 |
| 4,859,023 | 8/1989 | Eichenbaum et al. | 350/96.23 |
| 4,881,795 | 11/1989 | Cooper | 350/96.23 |
| 4,913,515 | 4/1990 | Braunmiller et al. | 385/109 |
| 4,913,517 | 4/1990 | Arroyo et al. | 350/96.23 |
| 4,953,946 | 9/1990 | Huybrechts | 350/96.23 |
| 4,971,419 | 11/1990 | Gartside, III et al. | 350/96.23 |

FOREIGN PATENT DOCUMENTS 0280255  2/1988 European Pat. Off. .
62-297811 12/1987 Japan .
2120398 11/1983 United Kingdom .

*Primary Examiner*—John D. Lee
*Attorney, Agent, or Firm*—Richard E. Jenkins

[57] ABSTRACT

An optical fiber cable of the type having a core comprising a plurality of units wherein each unit comprises a plurality of optical fibers extending generally along the cable and a binder wrapped about the unit. A tube containing a waterblocking material therein is provided to enclose the plurality of units, and a jacket is provided to enclose the tube. The improved cable provides for a binder comprising an interlocking stitch formed of one or more yarns to provide improved fiber unit identification and obviate "microbending" losses due to binder tension.

18 Claims, 2 Drawing Sheets

OPTICAL FIBER CABLE INCLUDING INTERLOCKING STITCH BINDER

DESCRIPTION

1. Technical Field

This invention relates to an optical fiber cable. More particularly, it relates to an optical fiber cable of the type having a core comprising a plurality of optical fiber unit groupings and in which an interlocking stitch binder is placed about each unit so as to provide for improved identification of separate optical fiber unit groupings.

2. Related Art

Binders have been traditionally used to aid in the identification of groups of twisted wires in copper telecommunication cable. The binder color scheme traditionally used includes 10 colors: 5 colors being identified as tip colors—blue, orange, green, brown and slate; and 5 colors being identified as ring colors—white, red, black, yellow and violet. Industry standard ANSI/EIA-359-A is applied for wire and cable insulation color identification and coding. A combination of one tip color and one ring color allows as many as 25 separate units to be identified using this color sequence.

The binder materials typically used are rayon threads, polyester threads, nylon threads or polypropylene tape typically 0.100" wide by 0.002" thick, and are traditionally applied via concentric binding heads. A spool of binder material is placed on a freely rotating assembly, and the free end of the binder material is threaded through a concentric, larger diameter ring system which is driven by a motor. The pitch of the binder can be maintained constant as the cable is advanced through the center of the binder assembly as long as the line speed of the cable and the rotational speed of the outer ring system are synchronized. As the material is paid off of the binder cop, its diameter is reduced and the inner, freely rotating pay-off changes speed relative to the constant speed of the outer ring system.

In one embodiment of the above design, a brake assembly is applied to the freely rotating central cop so that a specific tension can be maintained on the binder thread as it is wrapped around the copper wires in the cable. Traditionally, two binder heads are utilized, one containing one color of binder and the second containing a second color of binder to make the appropriate ring-tip color configuration on the cable core. The traditional concentric binder assembly machines offer the advantage of a constant pitch along the length of the unit core, and also offer the ability to apply the binder with relatively high tension onto the copper cable core. The disadvantage of such a machine is that the machine is subject to malfunction during the operation of the binder application. This can result in broken binders or total malfunction of the binding operation as one thread is pulled the length of the cable core due to lack of rotation of the binder.

In order to eliminate the potential for a mechanical malfunction, a simplified binding process was developed during the 1970s whereby the advancing copper cable core would simply pull the end of the binder from the cop which is on a stationary fixed support. The pitch of the binder in this case varies according to the amount of binding material still available on the pay-off cop. The binder pitch will be longest when the cop is full, and will decrease to its minimum when the binder is finally paying off from the last layers of binder at the cop's core. No tension control is maintained in this type of system, and hence this system can only be used for color identification-type schemes where the tension of the binder has little effect upon the product. In this method both the pitch and the tension of the binder on the unit vary depending upon whether the pay-off bobbin is full or empty.

U.S. Pat. No. 3,644,866 depicts a tightly bound textile strand product made by this latter method without the use of color-coded binders. By applying one binder package wound in a clockwise direction and the other wound in a counter-clockwise direction, a cross-binding type of pitch can be achieved. In practice, this can also be achieved simply by turning one binder cop in one direction relative to the other one and to the advancing cable core. Referring to FIG. 2 of the patent drawings, it can be seen that the binders are flying off the trailing end of the cops in the same direction as the advancing cable core. As known to those skilled in the art, some improvements were made to this method so that the binder would fly off in the opposite direction to the advancing cable core and pass back through the center of the spool. In this manner, a die could be used through which both the core and the binder would have to pass. Neither the binders disclosed in U.S. Pat. No. 3,644,866 nor those in the improved version thereof mentioned above are interlocked in any manner.

The first application of a binder thread to group together multiple fibers in an optical fiber cable that applicant is aware of is disclosed in U.S. Pat. No. 4,826,278. This patent discloses as an essential element a core comprising a plurality of optical fibers which are assembled together with a binder wrapped about the unit.

Commercial optical fiber cables manufactured in accordance with U.S. Pat. No. 4,826,278 or related U.S. Pat. No. 4,971,419 contain a single thread binder wrapped around a plurality of optical fibers. The groups of optical fibers are then encased by a single plastic tube containing a jelly-like material. Only one binder thread is applied to each unit of optical fibers which limits the number of units of optical fibers within the cable core to a number which is dependent upon the ability of the cable processing craftsperson to discern one color from another. (Of interest, Electronic Industries Association EIA SP-2331 is the proposed standard for color coding of fibers and fiber units within fiber optic cables.) Another disadvantage specific to the single binder process is that the binder is paid off from a non-rotating cop in the manner previously described. Both the plurality of optical fibers and the binder must pass through a die as the binder is being paid off. Therefore, the pitch of the binder as well as the tension thereof vary with the amount of supply on the bobbin.

The tension on a unit of optical fibers is very critical because optical fibers are subject to a phenomenon known as "microbending". This occurs when an optical fiber experiences normal forces against it which cause bends of very small radii at the point of force. The light traveling through the center of the core may be lost into the cladding at these contact points because of the small radius. Essentially, not all of the light can traverse the small radius, and some is radiated into the cladding. This results in lost power in the signal which is known as "attenuation" and which controls the distance between laser repeaters in an optical fiber transmission system. Consequently, the current method of applying the binders with an uncontrolled tension leaves much to be desired.

This shortcoming as disclosed above relative to the binder tension on the plurality of optical fibers is recognized in U.S. Pat. No. 4,836,640. This patent discloses the need to use depressed cladding optical fibers in a cable design utilizing binder threads. Single mode depressed cladding optical fibers are characterized by a sufficiently high difference between the refractive index of the core of the optical fiber and the inner cladding surrounding that core to make the fiber more insensitive to "microbending". This difference is achieved by designing the fiber with three different levels of refractive index: the outer cladding is pure $SiO_2$; the inner cladding has a refractive index less than the pure $SiO_2$; and the core has a refractive index greater than the $SiO_2$. Depressed clad single mode optical fibers differ from traditional matched clad single mode fibers in that matched clad fibers contain a single cladding of pure $SiO_2$ and a core of a higher refractive index than $SiO_2$. Matched clad single mode fibers of the type utilized for telecommunications are more sensitive to the "microbending" phenomena than are depressed clad single mode fibers. One may conclude from U.S. Pat. No. 4,836,640 that a helical wrapped thread binder system requires fibers of the depressed cladding character in order to function properly.

Another shortcoming of optical fiber cable manufactured with single thread binders is the propensity of the thread binder to unravel from the group of fibers which it surrounds during the cable preparation step which must be performed prior to fiber splicing. The joining of fiber optic cables is accomplished by removing several meters of sheathing material and tube to expose the optical fibers such that either connectors or arc fusing methods can be utilized to join fibers together from one cable to the next.

An essential element of the fiber joining process is that one particular color fiber identified by its color binder unit is joined with its mate in the next cable with the identical unit and fiber color. The removal of the inner plastic tube surrounding the multiplicity of bundled fibers is accomplished by ring cutting the plastic tube and then pulling it in the longitudinal direction toward the end of the cable. The shearing force thus applied to the bundled fibers has a tendency to cause the thread binder to unravel and assume a longitudinal configuration parallel to the fiber bundle which it previously encircled. It is very difficult for the cable craftsperson performing the cable joining process to differentiate like colored fibers from different fiber bundles within a common tube when several of the thread binders have unraveled in the aforementioned fashion. The binder threads intended to differentiate one fiber bundle from another within a tube are thus rendered useless during the cable stripping process.

What is still needed, and what is not provided by the prior art, is an optical fiber cable of the type utilizing a binder wrapped about each of a plurality of optical fiber unit groupings wherein the binder cannot be unintentionally unraveled during the cable stripping process and which applies no torque or normal forces to the optical fiber unit groups. This would provide for improved optical transmission characteristics, allow the use of matched clad single mode fibers, ensure differentiation of fiber bundles after stripping, and increase the possible number of differentiable optical fiber unit groupings within a cable.

DISCLOSURE OF THE INVENTION

In accordance with the present invention, applicant provides an optical fiber cable of the type having a core comprising a plurality of units wherein each unit includes a plurality of optical fibers extending generally along the cable and a binder wrapped about the unit, a tube enclosing the plurality of units and further containing a waterblocking material therein, and a jacket which encloses the tube, wherein an improved binder is provided comprising at least one interlocking stitch.

It is therefore the object of this invention to provide an optical fiber cable of the type wherein the core comprises a plurality of differentiable optical fiber units and which incorporates an improved interlocking stitch binder wrapped about each of the units.

More specifically, it is the object of the present invention to provide an optical fiber cable of the type wherein the core comprises a plurality of differentiable optical fiber units and wherein the binder wrapped about each unit cannot be unintentionally unwrapped during the cable stripping process.

It is another object of the present invention to provide an optical fiber cable of the type wherein the core comprises a plurality of differentiable optical fiber units and wherein the binder wrapped about each unit requires intentional removal in order to access the individual fibers, fiber ribbons, or fiber groups.

It is another object of the present invention to provide an optical fiber cable of the type wherein the core comprises a plurality of differentiable optical fiber units and wherein the binder wrapped about each unit provides for increasing the potential number of differentiable units within a cable.

It is another object of the present invention to provide an optical fiber cable of the type wherein the core comprises a plurality of differentiable optical fiber units and wherein the binder wrapped about each unit has a controlled pitch of short enough length to allow bundle differentiation upon cable stripping.

It is another object of the present invention to provide an optical fiber cable of the type comprising matched clad single mode optical fibers wherein the interlocking stitch binder is applied with sufficiently controlled low tension such that "microbending" is not introduced to the fibers.

It is yet another object of the present invention to provide an optical fiber cable of the type wherein the core comprises a plurality of differentiable optical fiber units and wherein the binder is wrapped about each unit with minimal, controlled tension so as not to induce "microbending" losses in any of the optical fibers within the unit and to thereby improve optical characteristics of the cable.

BRIEF DESCRIPTION OF THE DRAWINGS

Some of the objects of the invention having been stated, other objects will become evident and other features of the invention will be more readily understood as the description proceeds, when taken in connection with the accompanying drawings in which.

BEST MODE FOR CARRYING OUT THE INVENTION

Figure 1:
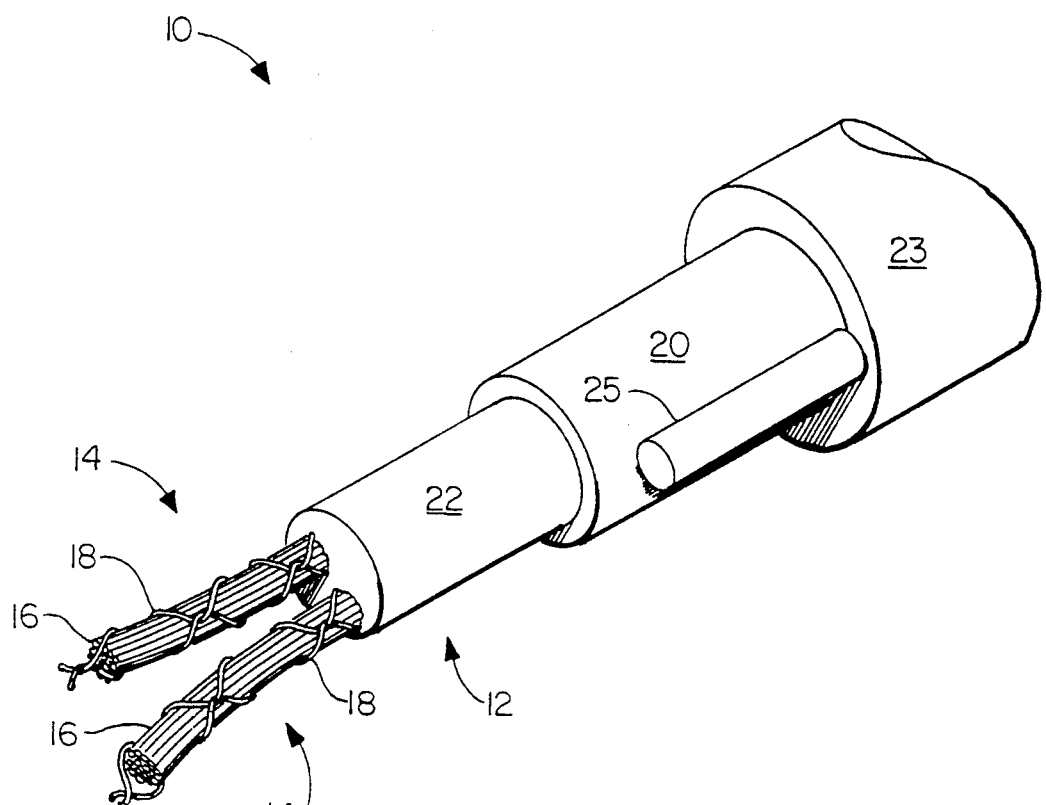
FIG. 1 is a perspective view of an optical fiber cable of this invention.
Figure 2:
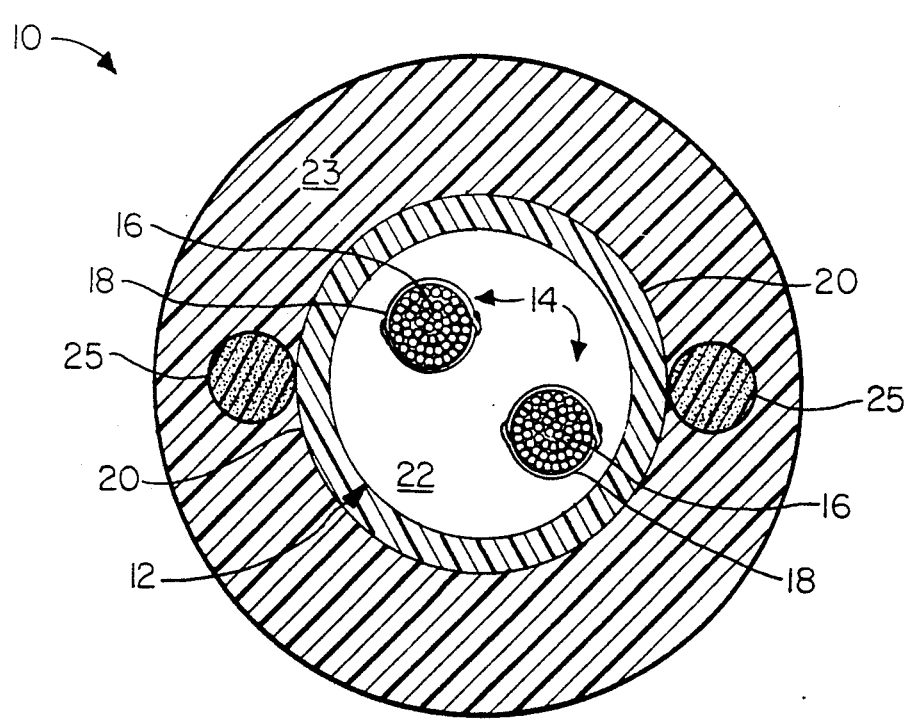
FIG. 2 is an end section view of the cable of FIG. 1.

Referring now to FIGS. 1-4 of the drawings, there are shown several preferred embodiments of the cable of this invention which will be discussed in detail. First, with reference to FIGS. 1 and 2, a first embodiment of the cable of the invention is depicted which is conventional except for the binder and which will be fully appreciated by one skilled in the fiber optic cable art with the benefit of the description hereinafter. Optical fiber cable 10 includes a core 12 comprising a plurality of units generally designated 14 and which each include a plurality of individual optical fibers 16. As can be further seen in FIGS. 1 and 2, optical fiber units 14 are each individually bound by an interlocking stitch binder 18 and are enclosed in tube 20 which is made of a plastic material such as polyethylene or polybutylene terephthalate. Tube 20 within which units 14 positioned is filled with a suitable waterblocking material 22 and provided with a jacket 23 thereover which is made of a plastic material such as polyvinylchloride or polyethylene. Representative suitable waterblocking materials are disclosed in U.S. Pat. No. 4,701,016 and U.S. Pat. No. 4,826,278. However, the invention is not limited to these waterblocking materials and other formulations of waterblocking materials are suitable.

Most suitably, but not a requirement of the present invention, a plurality of rigid tension members 25 having a higher Young's Modulus and a lower thermal expansion coefficient than cable 10 are positioned radially outwardly from tube 20 and extend in generally parallel relationship along the length of the tube between tube 20 and outer jacket 23. Such a sheath construction or variations thereof is disclosed in U.S. Pat. No. 4,770,489 which is incorporated by reference herein. Additional materials may be placed between tube 20 and rigid tension members 25 and jacket 23 such as cushioning layers of plastic fibers, aramid fibers, nonwoven fabrics, waterblocking jellies or tapes, flat or corrugated overlapped metal tapes and hot melt glue. These common sheathing materials which are well known to those skilled in the art can provide additional features to the cable for specific applications (see, for example, U.S. Pat. No. 4,844,575). However, the inclusion or omission of these materials does not bear upon the practice of this invention.

It should be further appreciated that optical fibers 16 are assembled in units 14 either with or without intended stranding. Interlocking stitch binder 18 is most suitably wrapped over each unit 14 under controlled tension and pitch by a thread overlock sewing machine such as the SINGER Model No. 14U44 which is incorporated into a conventional optical fiber cable manufacturing line. At least one thread interlocked upon itself could be used to manufacture the disclosed invention. Interlocking stitch binder 18 should be wrapped around each unit 14 with minimal and controlled tension so that the propensity of optical fibers 16 for "microbending" is avoided because of the non-existence or minimization of application of normal forces from binder tension against any of optical fibers 16 in unit 14.

Also, the use of interlocking stitch binder 18 obviates the tendency of prior art binders to unravel from optical fiber units 14 during cable preparation immediately prior to fiber splicing. As known to those skilled in the art, the joining of cables 10 is accomplished by removing several meters of sheathing material to expose optical fibers 16 such that either connectors or arc fusing can be utilized to join the optical fibers from one cable 10 to another cable 10. Normally, during the removal of tube 20 surrounding optical fiber units 14, the shearing force generated by ring cutting tube 20 and then pulling it in the longitudinal direction toward the end of cable 10 for removal tends to cause prior art thread binders to unravel and extend parallel to optical fiber unit 14 which it previously wrapped. Thus, the fiber joining procedure is made very difficult when several of the conventional thread binders have unraveled and no longer serve to identify which optical fiber unit 14 they were associated with for identification purpose.

Applicant's use of interlocking stitch binder 18 serves to obviate this problem and allows for longitudinal removal of tube 20 of the cable sheath without affecting interlocking stitch binders 18 and their ability to differentiate between and identify optical fiber units 14. In this fashion, applicant's inventive cable construction facilitates the fiber splicing or fiber joining process.

Referring yet again to FIGS. 1 and 2, it should be appreciated that interlocking stitch binder 18 may be formed of one or more yarns of the same or different colors as required by cable construction specifications. The ability to use different colors for the yarns in interlocking stitch binder 18 and the use of two, three or even more threads of different color in interlocking stitch binder 18 can result in the ability to differentiate and identify an almost unlimited number of optical fiber units 14. This will become more important in the future since higher fiber count cables will be necessary in many new applications. In this regard, applicant also contemplates that more than one interlocking stitch binder 18 could be wrapped about each optical fiber unit 14 as an alternative method of providing identifiability to a very large number of units 14.

Figure 3:
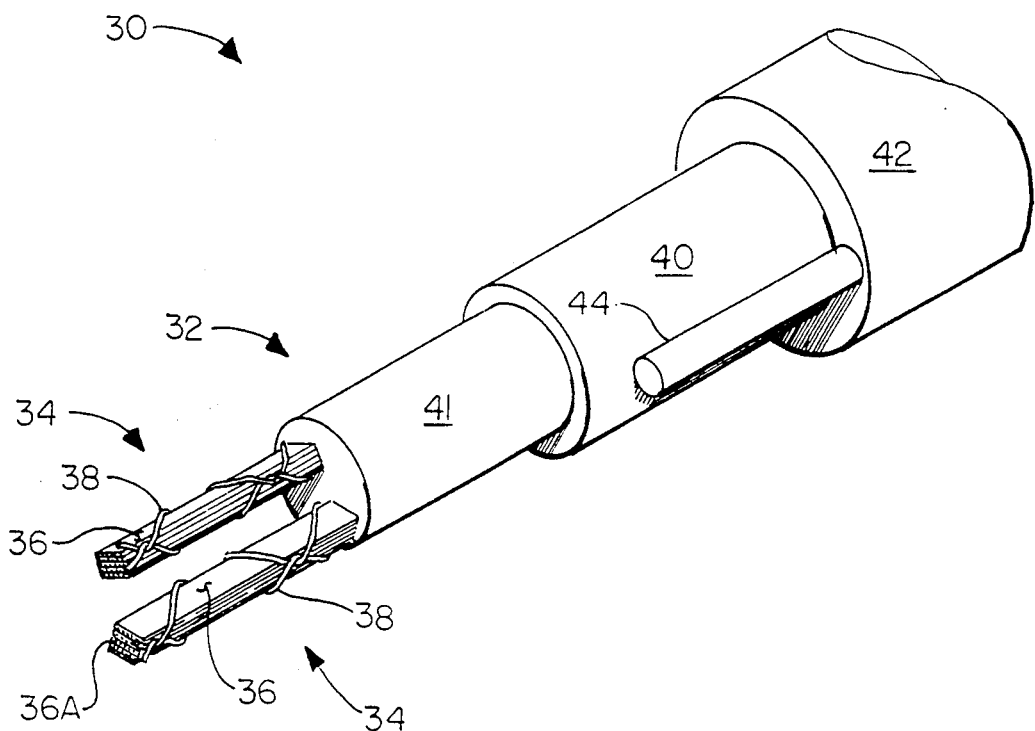
FIG. 3 is a perspective view of another embodiment of the cable of this invention wherein the optical fiber unit groups in the core comprise a plurality of optical fiber ribbons.
Figure 4:
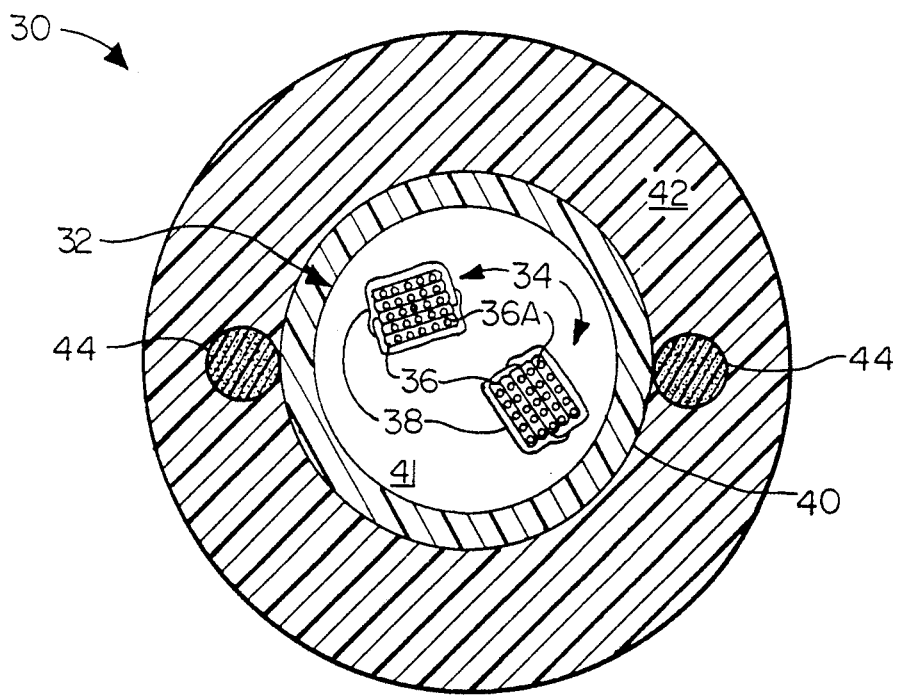
FIG. 4 is an end section view of the cable of FIG. 3.

A second embodiment of applicant's invention is shown in FIGS. 3 and 4 wherein the cable is generally designated 30. Cable 30 includes a core 32 containing a plurality of units 34 each of which includes a plurality of optical fiber ribbons 36. Optical fiber ribbons 36 are stacked into individual units 34 which are each bound by being wrapped about by an interlocking stitch binder 38. Each optical fiber ribbon 36 is formed from a plurality of optical fibers 36A which are affixed to each other by means of a cured resin as will be appreciated by one skilled in the art. Optical fiber ribbons 36 may or may not be stranded, and interlocking stitch binders 38 may be formed of one or more yarns of either the same or different colors in accordance with the cable specifications. Units 34 are positioned within tube 40 which is made of a plastic material such as polyethylene or polybutylene terephthalate. Tube 40 is filled with a suitable waterblocking material 41 (as discussed in detail above) and provided with a jacket 42 which is made of a plastic material such as polyvinylchloride or polyethylene. Most suitably, but not a requirement of the present invention, a plurality of rigid tension members 44 are positioned radially outwardly from tube 40 (as discussed in detail above with reference to similar tension members 25 in FIGS. 1 and 2).

Summarily, applicant's invention as described in detail hereinabove provides a number of unexpected and surprising improvements to a loose tube fiber optic cable construction including:

1. The differentiation of larger numbers of optical fiber units within the cable core;

2. Providing a binder which cannot be unintentionally unraveled from fiber units in the cable core during the cable stripping process;
3. Providing a binder which must be intentionally removed in order to access the individual fibers, fiber ribbons, or fiber groups;
4. Providing a binder which is wrapped about a multiple optical fiber unit under a controlled, low tension so as not to induce "microbending" losses in any of the optical fibers within the unit;
5. Providing a binder which permits the use of single mode matched clad optical fibers within the unit;
6. Providing a binder which is applied about a multiple optical fiber unit under a controlled pitch; and
7. Providing a binder which may be applied during cable manufacturing without the necessity to thread the cable through binding equipment.

It will be understood that various details of the invention may be changed without departing from the scope of the invention. Furthermore, the foregoing description is for the purpose of illustration only, and not for the purpose of limitation—the invention being defined by the claims.

What is claimed is:

1. In an optical fiber cable of the type having a core comprising a plurality of units wherein each unit comprises a plurality of optical fibers extending generally along the cable and a binder wrapped about the unit, a tube enclosing said plurality of units and further containing a waterblocking material therein, and a jacket which encloses said tube, the improvement wherein said binder comprises at least one non-helical and non-braided yarn interlocking stitch.

2. An optical fiber cable according to claim 1 said units each comprise a plurality of singular optical fibers assembled together.

3. An optical fiber cable according to claim 1 wherein said units each comprise a plurality of optical fiber ribbons assembled together.

4. An optical fiber cable according to claim 1 wherein said interlocking stitch comprises one yarn.

5. An optical fiber cable according to claim 1 wherein said interlocking stitch comprises at least two yarns of at least two different colors.

6. An optical fiber cable according to claim 1 wherein said interlocking stitch comprises at least two yarns of the same color.

7. An optical fiber cable according to claim 1 wherein said interlocking stitch is wrapped about said unit under little or no tension.

8. An optical fiber cable according to claim 1 wherein said tube and jacket are made of a plastic material.

9. An optical fiber cable according to claim 1 wherein said optical fibers are single mode matched clad optical fibers.

10. An optical fiber cable according to claim 1 comprising a plurality of rigid tension members having a higher Young's Modulus and a lower thermal expansion coefficient than said cable and positioned radially outwardly from said tube and extending generally in the lengthwise direction thereof.

11. In an optical fiber cable of the type having a core comprising a plurality of units wherein each unit comprises a plurality of optical fibers extending generally along the cable and a binder wrapped about the unit, a tube which is made of plastic material enclosing said plurality of units and further containing a waterblocking material therein, and a jacket which is made of plastic material and encloses said tube, the improvement wherein said binder comprises at least one non-helical and non-braided interlocking yarn stitch formed from at least two yarns.

12. An optical fiber cable according to claim 11 wherein said units each comprise a plurality of singular optical fibers assembled together.

13. An optical fiber cable according to claim 11 wherein said units each comprise a plurality of optical fiber ribbons assembled together.

14. An optical fiber cable according to claim 11 wherein said at least two yarns are of different colors.

15. An optical fiber cable according to claim 11 wherein said at least two yarns are of the same color.

16. An optical fiber cable according to claim 11 wherein said interlocking stitch is wrapped about said unit under little or no tension.

17. An optical fiber cable according to claim 11 wherein said optical fibers are single mode matched clad fibers.

18. An optical fiber cable according to claim 11 comprising a plurality of rigid tension members having a higher Young's Modulus and a lower thermal expansion coefficient than said cable and positioned radially outwardly from said tube and extending generally in the lengthwise direction thereof.

* * * * *